United States Patent [19]

Kitahara et al.

[11] Patent Number: 4,709,283
[45] Date of Patent: Nov. 24, 1987

[54] RECORDING DISK CENTERING AND CLAMPING APPARATUS

[75] Inventors: Toshihiro Kitahara, Tokyo; Yoshiaki Sakai; Kou Kobayashi, both of Higashikurume; Satoru Kikuchi, Mitaka, all of Japan

[73] Assignee: Teac Corporation, Tokyo, Japan

[21] Appl. No.: 774,336

[22] Filed: Sep. 10, 1985

[30] Foreign Application Priority Data

Sep. 20, 1984 [JP] Japan .................... 59-142547

[51] Int. Cl.⁴ .................... G11B 5/016; G11B 17/04
[52] U.S. Cl. .................... 360/99; 360/97; 360/133
[58] Field of Search .................... 360/97–99, 360/133, 96.5–96.6

[56] References Cited

U.S. PATENT DOCUMENTS

| | | | |
|---|---|---|---|
| 3,768,815 | 10/1973 | Mathurin | 360/97 |
| 4,125,883 | 11/1978 | Rolph | 360/97 |
| 4,602,306 | 7/1986 | Noda | 360/99 X |

Primary Examiner—A. J. Heinz
Assistant Examiner—Alfonso Garcia
Attorney, Agent, or Firm—Woodcock Washburn Kurtz Mackiewicz & Norris

[57] ABSTRACT

Apparatus for data transfer with a disk cartridge having a flexible magnetic disk rotatably housed in a protective envelope with some play in its own plane. A motor driven hub has a socket defined concentrically therein, with an annular disk bearing surface formed around the socket. Rotatably mounted to a hinged clamp arm, a clamp has a tapered collet engageable in the socket in the drive hub through a central opening in the magnetic disk, and a flange on the collet for clamping an exposed annular portion of the disk against the disk bearing surface. Being loose in the protective envelope, the magnetic disk has been liable to be caught in the drive hub socket by the tapered collet which travels along an arcuate locus into engagement in the socket. In order to preclude this possibility, the disk cartridge on being loaded in the apparatus is so positioned on the drive hub that the geometrical center of the disk cartridge is offset a specified distance from the axis of rotation of the drive hub in a direction away from the fulcrum of the clamp arm.

4 Claims, 9 Drawing Figures

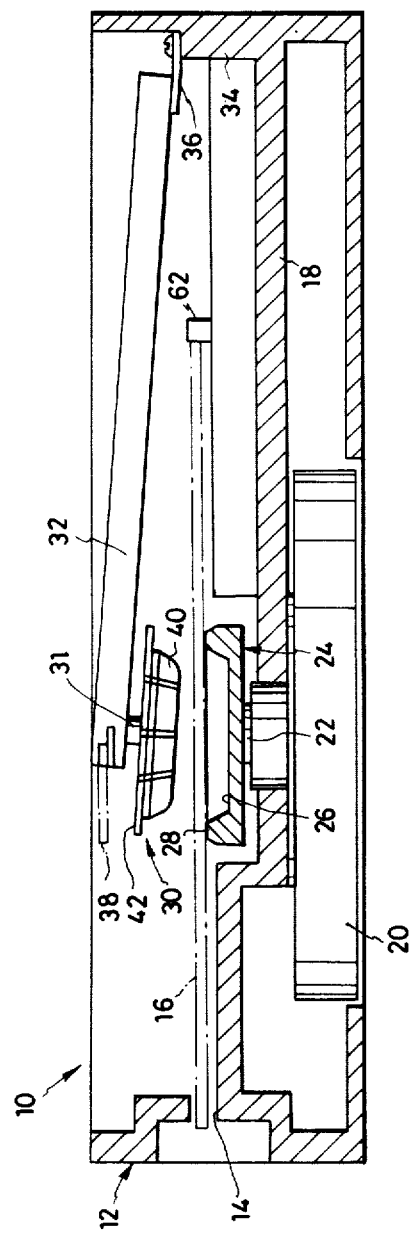
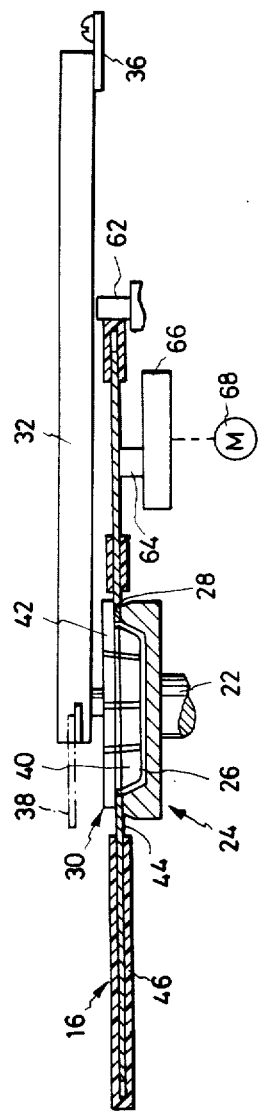

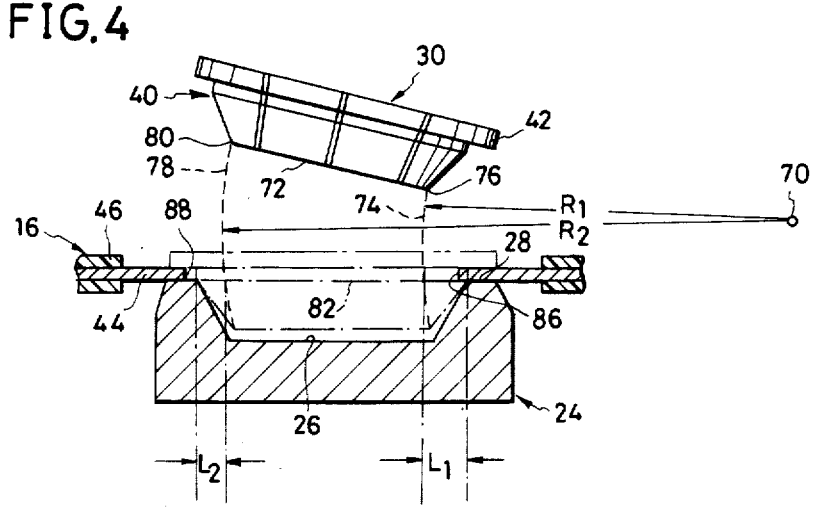
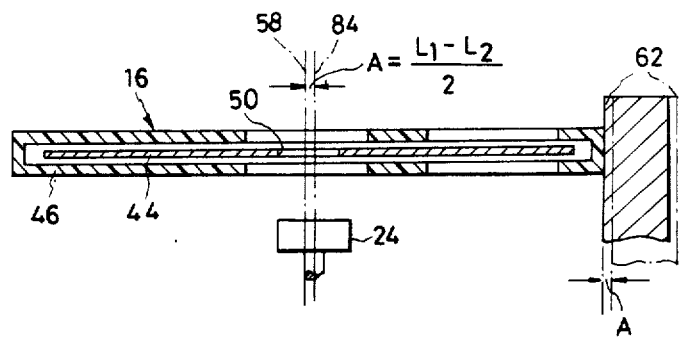
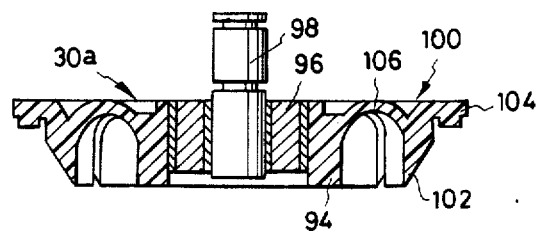

RECORDING DISK CENTERING AND CLAMPING APPARATUS

BACKGROUND OF THE INVENTION

Our invention relates generally to apparatus for data transfer with a recording disk, such as a flexible magnetic disk, that is housed in an apertured protective envelope to make up a disk cartridge, and particularly to improved means in such apparatus, generally referred to as a disk drive, for centering and clamping the recording disk in position preparatory to data transfer with a transducer head assembly or a pair of such assemblies.

Mathurin U.S. Pat. No. 3,768,815 and Rolph U.S. Pat. No. 4,125,883 represent typical conventional examples of means for centering and clamping a flexible magnetic disk in a disk drive. These and other comparable prior art devices commonly employ a tapered, flanged collet rotatably mounted to a hinged clamp carrier, such as a cover forming a part of the housing of the disk drive or a clamp arm mounted within the housing, for movement into and out of engagement with a socketed drive hub via the central hole in the magnetic disk. As is well known, the magnetic disk is somewhat loosely housed in an apertured, generally square protective envelope. Consequently, even though the disk cartridge itself may be correctly positioned with respect to the drive hub, the magnetic disk therein may be displaced or have play, in its own plane within the envelope and so may be out of axial alignment with the drive hub. This will present no serious problem with disk drives of usual thicknesses, or dimensions in the axial direction of the drive hub, as the tapered collet will, in most cases, nevertheless pass through the central hole in the magnetic disk for centering same.

The current trend with disk drives, however, is toward the reduction of their thicknesses. This requires the minimization of the axial dimensions of both drive hub and collet. The tapered collet of such reduced axial dimension may fail to center the magnetic disk if it is displaced too much within the envelope, thrusting the edge of the disk around its central hole into the socket in the drive hub and so ruining the disk. The possibility of the collet ruining the magnetic disk becomes even higher as the collet is usually mounted to a hinged carrier as aforesaid and so must follow an arcuate path in traveling into engagement with the drive hub.

SUMMARY OF THE INVENTION

We hereby found out how to correctly center and clamp a recording disk in data transfer apparatus for use therewith, in the face of the possible displacement or play, of the disk in its own plane within its protective envelope and without any major alteration of the existing parts of the apparatus.

Briefly, our invention may be summarized as apparatus for data transfer with a recording disk cartridge having a flexible recording disk rotatably housed in a protective envelope with play in its own plane, with the envelope having formed in each of its opposite sides a central opening larger than a central opening in the recording disk to expose an annular portion thereof. Included are drive means having a drive hub with a socket defined coaxially therein and an annular disk bearing surface formed concentrically around the socket. Rotatably mounted to a hinged clamp carrier, a clamp includes a collet tapering toward a leading end thereof, directed toward the drive hub, for engagement in the socket in the drive hub through the central opening in the recording disk for centering the latter with respect to the drive means, and a flange on the collet for clamping the exposed annular portion of the recording disk against the disk bearing surface of the drive hub. Also included are positioning means for locating the loaded recording disk cartridge in such a position on the drive hub that the geometrical center of the disk cartridge is offset a predetermined distance from the axis of rotation of the drive hub in a direction away from the fulcrum of the clamp carrier. The predetermined distance of offset is specified as being less than the difference $L1-L2$, where $L1$ is the distance between the point of intersection of the locus of that point on an annular edge around the leading end of the collet which is nearest to the fulcrum of the clamp carrier with the plane containing the disk bearing surface of the drive hub and that point on an annular edge of the drive hub bounding the entrance end of the socket which is nearest to the fulcrum of the clamp carrier, and where $L2$ is the distance between the point of intersection of the locus of the point on the annular edge around the leading end of the collet which is farthest away from the fulcrum of the clamp carrier with the plane containing the disk bearing surface of the drive hub and that point on the annular edge of the drive hub bounding the entrance end of the socket which is farthest away from the fulcrum of the clamp carrier.

The annular edge around the leading end of the collet may be rounded. In that case the points in question should be taken on that line around the rounded annular edge where a tangent thereto is at an angle of, say, 20 degrees with respect to a plane at right angles with the axis of the collet. That portion of the rounded annular edge where the tangent angle is smaller will hardly have a disk centering effect.

Received with play in the envelope, the recording disk may take various positions in its own play with respect to the envelope. Therefore, although the disk cartridge itself is positioned as above stated in the specific offset position with respect to the drive hub, the position of the recording disk is subject to change with respect to the drive hub and the collet. On an average, however, those points on the annular edge around he leading end of the tapered collet which are closest to, and farthest from, the fulcrum of the clamp carrier will be approximately equally spaced from the annular inside edge of the recording disk when they pass the central hole in the disk. There will thus be little or no likelihood of the annular inside edge of the recording disk being depressed in part into the drive hub socket by the tapered collet even if the axial dimensions of the drive hub socket and collet are reduced to a minimum for the provision of a thin disk drive.

The above and other features and advantages of out invention and the manner of realizing them will become more apparent, and the invention itself will best be understood, from a study of the following description and appended claims, with reference had to the attached drawings showing some preferred embodiments of our invention.

BRIEF DESCRIPTION OF THE DRAWINGS

FIG. 1 is a vertical section through the apparatus for data transfer with a flexible magnetic disk constructed in accordance with the novel concepts of our invention, the view showing only those parts of the apparatus which are essential for our invention; with the clamp shown out of engagement with the socketed drive hub;

FIG. 2 is a fragmentary vertical section showing some pertinent parts of the apparatus of FIG. 1 with the clamp engaged with the drive hub for clamping the magnetic disk therebetween;

FIG. 4 is an enlarged axial section, partly in elevation, through the drive hub and clamp of the apparatus of FIG. 1, the view being explanatory of the arcuate path of the clamp moving into and out of engagement with the drive hub;

FIG. 5 is a diagrammatic sectional view explanatory of the positional relationship between the drive hub and the magnetic disk cartridge which has been positioned by the positioning means in accordance with our invention;

FIG. 9 is an axial section through an alternative form of the clamp that may be employed in the practice of our invention.

DESCRIPTION OF THE PREFERRED EMBODIMENTS

Figure 3:
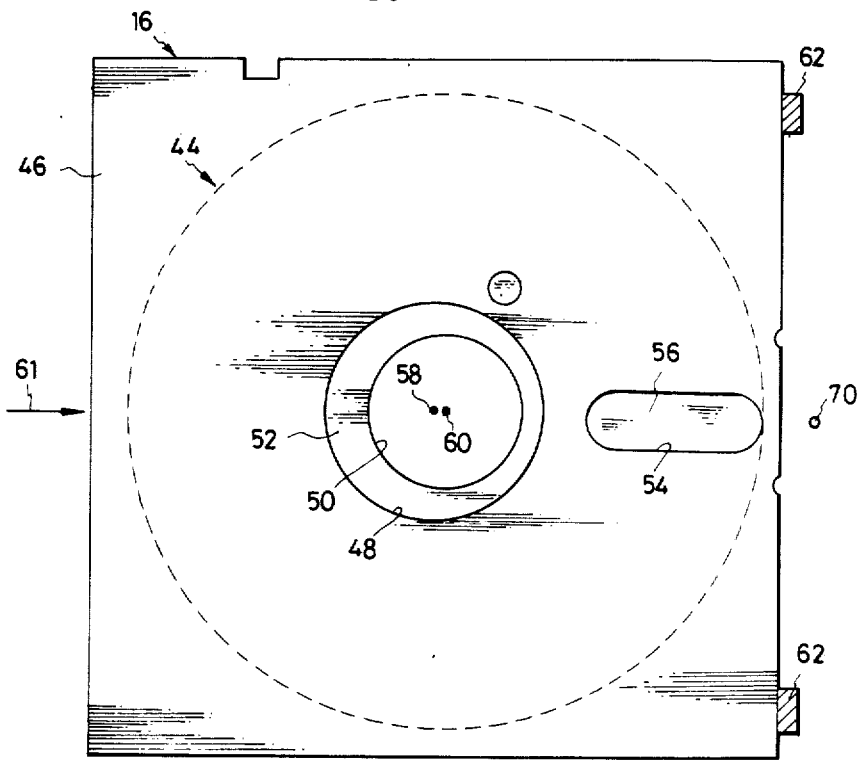
FIG. 3 is a plan view of a flexible magnetic disk cartridge for use with the apparatus of FIG. 1, shown together with the positioning means of the apparatus, the view being also explanatory of the variable positional relationship between the magnetic disk and its envelope.

We will first describe the general organization of the data transfer apparatus incorporating the principles of our invention, only to an extent necessary for a full understanding of the invention. Generally designated 10 in FIG. 1, the data transfer apparatus includes frame means or housing 12 defining an entrance slot 14 in its front face, directed to the left in FIG. 1, for the insertion and withdrawal of a flexible magnetic disk cartridge 16 to and from a preassigned data transfer position. The frame means 12 includes a platform 18 having a disk drive motor 20 mounted on its underside. The disk drive motor 20 has an output shaft 22 extending upwardly through the platform 18 and has a drive hub 24 nonrotatably mounted on its top end. The drive hub 24 has a socket 26 defined coaxially in its top, with an annular disk bearing surface 28 left concentrically around the socket.

Disposed over the drive hub 24 is a clamp 30 rotatably mounted on a shaft 31 depending from a clamp carrier herein shown as a clamp arm 32. The clamp arm 32 is proximally hinged to a ledge 34 of the frame means 12 via a cantilever spring 36 and has the clamp 30 rotatably mounted to its distal end, so that the clamp is movable jointly with the clamp arm 32 into and out of engagement with the drive hub 24 and, when engaged therewith, is rotatable jointly therewith. The cantilever spring 36 biases the clamp arm 32 in a clockwise direction, as viewed in FIG. 1, normally holding the clamp 30 out of engagement with the drive hub 24 as depicted in the same figure. The clamp arm 32 is to be depressed to the position of FIG. 2 by a clamp actuating member 38 against the force of the cantilever spring 36 for moving the clamp 30 into engagement with the drive hub 24.

As shown also in FIGS. 1 and 2, the clamp 30 comprises a collet 40 tapering toward its leading end, directed toward the drive hub 24, to fit in the socket 26 in the drive hub 24, and a flange 42 on the trailing end of the collet. The clamp 30 is coaxial with the drive hub 24 when engaged therewith.

FIG. 3 is a detailed illustration of the disk cartridge 16. It has a flexible magnetic disk 44 rotatably housed in a protective envelope or jacket 46. The envelope 46 has formed in each of its opposite sides a central opening 48 larger than a central opening 50 in the magnetic disk 44 to expose an annular portion 52 of the disk. Also formed in each side of the envelope 46 is a slot 54 exposing a radial portion 56 of the magnetic disk 44. Being required to revolve freely within the envelope 46, the magnetic disk 44 has some play in its own plane with respect to the envelope. Accordingly, the geometrical center 58 of the disk cartridge 16, or of the envelope 46, may not be in register with the center 60 of the magnetic disk 44. We will later refer to this misalignment between disk 44 and envelope 46.

The disk cartidge 16 of the foregoing construction is to be loaded, in the direction of the arrow 61 in FIG. 3, in the data transfer apparatus 10 through its front entrance slot 14 into abutment against a pair of fixed stops 62 on the frame means 12. As shown in FIG. 2, the exposed annular disk portion 52 of the thus loaded disk cartridge 16 is to be clamped between the disk bearing surface 28 of the drive hub 24 and the flange 42 of the clamp 30 as the collet 40 fits in the drive hub socket 26 through the central opening 50 in the disk. FIG. 2 also shows a magnetic transducer head assembly 64 mounted on a carriage 66 for data transfer engagement with the radial disk portion 56 through one of the slots 54 in the envelope 46. We understand that, as is conventional with disk drives, either another transducer head assembly or a pad (neither shown) is provided for engagement with the radial disk portion 56 disk 44 through the other slot 54 in the envelope 46. The carriage 66 is coupled to a head transport motor 68 of the electric stepping type via a rotary to linear converter, not shown, of any known or suitable construction. The head transport motor 68 coacts with the rotary to linear converter for reciprocably and incrementally transporting the transducer head assembly 64 radially of the magnetic disk 44 for track to track accessing.

We will now proceed to the discussion of the principles of our invention as applied to the data transfer apparatus 10 of the foregoing configuration. We propose that the pair of stops 62 be so disposed on the frame means 12 that the loaded disk cartridge 16 may be stopped with its geometrical center 58 offset a specifiable distance and in a specifiable direction from the axis of the drive hub 24. The following description of FIG. 4 will make clear the reasons for this offset between disk cartridge 16 and drive hub 24.

The clamp 30 travels an arcuate path about the fulcrum 70 of the clamp arm 32 into and out of enagement with the drive hub 24. In centering the magnetic disk 44 by the tapered collet 40 of the clamp 30, it is the locus of the annular edge 72 around the leading end of the collet that merits the utmost consideration. The dashed line designated 74 in FIG. 4 indicates the locus of that point 76 on the annular edge 72 of the collet 40 which is nearest to the fulcrum 70 of the clamp arm 32. The dashed line 78 denotes the locus of that point 80 on the annular edge 72 which is farthest from the fulcrum 70 of the clamp arm 32. In cases where the annular edge 72 around the leading end of the collet is rounded, the points 76 and 80 in question may be taken on that line on the rounded annular edge where the tangent thereto is at an angle of 20 degrees or so with respect to a plane at right angles with the axis of the collet.

FIG. 4 further demonstrates that the loci 74 and 78 are curved about the clamp arm fulcrum 70 with radii R1 and R2, respectively. Consequently, as viewed in FIG. 4, the points of intersection of the loci 74 and 78 with a plane 82 containing the disk bearing surface 28 of the drive hub 24 (i.e. the plane of the entrance or top end of the socket 26 in the drive hub) are respectively located leftwardly of lines that pass the points 76 and 80 on the annular edge 72 of the collet 40 when the latter is fully engaged in the drive hub socket 26 and which are drawn parallel to the axis of the drive hub 24. The distance L1 between the point of intersection of the locus 74 with the plane 82 and that point on the annular edge of the drive hub 24 bounding the entrance end of the socket 26 which is nearest to the clamp arm fulcrum 70 is therefore greater than the distance L2 between the point of intersection of the locus 78 with the plane 82 and the point on the annular edge of the drive hub 24 bounding the entrance end of the socket 26 which is farthest from the clamp arm fulcrum 70.

We conclude from the foregoing considerations that the geometrical center 58 of the recording disk cartridge 16 should be offset from the axis 84 of the drive hub 24 a preassigned distance A of approximately $(L1-L2)/2$ in a direction away from the clamp arm fulcrum 70. The disk cartridge 16 can be easily so positioned on being loaded in the apparatus 10 by disposing the offsetting means or pair of stops 62 in the required position.

Let it be assumed that the magnetic disk 44 of the disk cartridge 16, loaded in the apparatus 10 and positioned as above, is disposed concentrically within the envelope 46. Then the center 60 of the magnetic disk 44 will also be displaced the distance A from the axis 84 of the drive hub 24. The distance between that point 86 on the annular edge of the magnetic disk 44 defining the central opening 50 which is nearest to the clamp arm fulcrum 70 and the point of intersection of the locus 74 with the plane 82 will be equal to the distance between that point 88 on the annular edge of the magnetic disk 44 defining the central opening 50 which is farthest from the clamp arm fulcrum 70 and the point of intersection of the locus 78 with the plane 82. Since then both loci 74 and 78 are contained in the central opening 50 of the magnetic disk 44, the tapered collet 40 of the clamp 30 will pass through the central opening 50 of the magnetic disk 44 when the clamp arm 32 is depressed, thereby correctly centering and clamping the disk.

Figure 6:
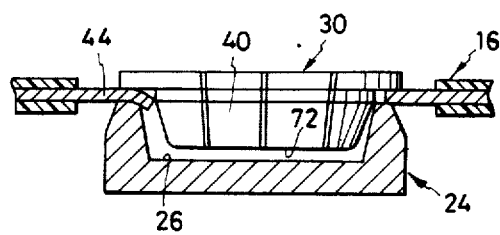
FIG. 6 is a view similar to FIG. 4 but showing the magnetic disk caught in the socket in the drive hub in accordance with prior art.

The magnetic disk 44 may be displaced rightwardly, or toward the pair of stops 62, within the envelope 46, as illustrated in FIG. 3. If this disk cartridge 16 were positioned in axial alignment with the drive hub 24, as has been the case heretofore, then the leading end 72 of the collet 40 might depress an inner edge portion of the magnetic disk 44 into the driven hub socket 26, as illustrated in FIG. 6, thus failing to center the disk and possibly destroying same.

Since the envelope 46 of the disk cartridge 16 is positioned with its center 58 displaced from the axis 84 of the drive hub 24 in a direction away from the clamp arm fulcrum 70 in accordance with our invention, this displacement of the envelope 46 serves to substantially cancel the rightward displacement of the magnetic disk 44 with respect to the envelope. The distal point 80 on the annular edge 72 around the leading end of the collet 40 will thus pass through the central opening 50 of the magnetic disk 44, provided, however, that the above assumed displacement of the center 60 of the disk from the center 58 of the envelope 46 is not more than $A+L2=(L1-L2)/2 + L2$. Then the magnetic disk 44 will be correctly centered and clamped as shown in FIG. 2.

It is also possible that the magnetic disk 22 be displaced leftwardly, as seen in FIG. 3, of the envelope 46. Then the point 86, FIG. 4, on the annular edge of the disk 44 bounding its central opening 50 will come closer to the locus 74 of the proximal point 76 on the annular edge 72 of the collet 40. However, since the distance L1 is greater than the distance L2, the collet 40 will not normally push the disk into the drive hub socket 26.

Second Form

Figure 7:
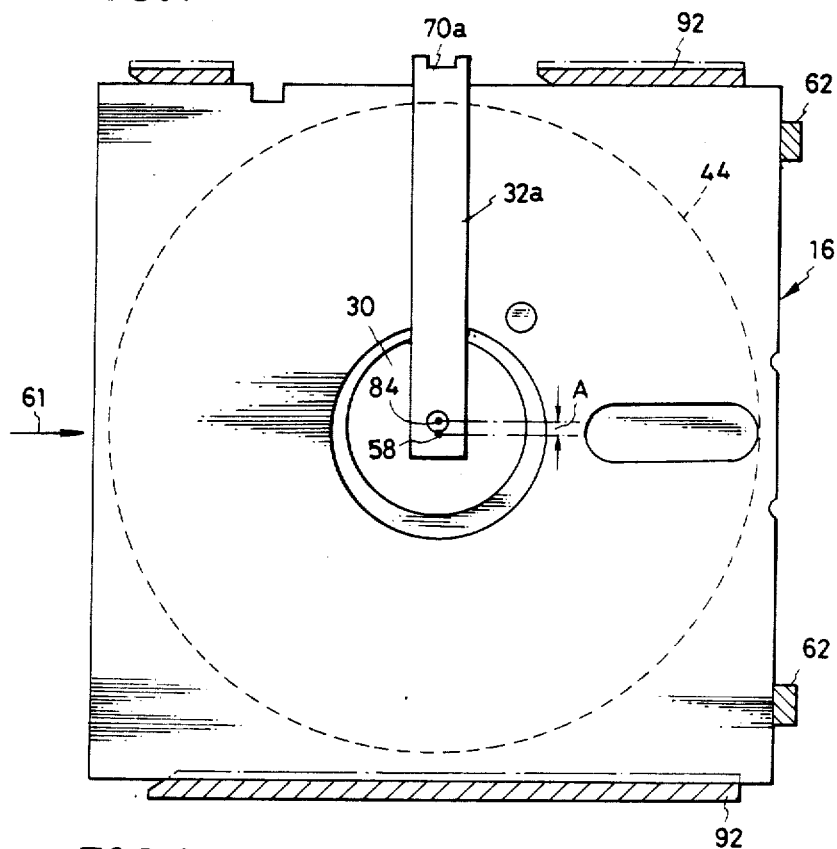
FIG. 7 is a view similar to FIG. 1 but showing the disk cartridge in combination with clamping means and positioning means representing another preferred embodiment of our invention.
Figure 8:
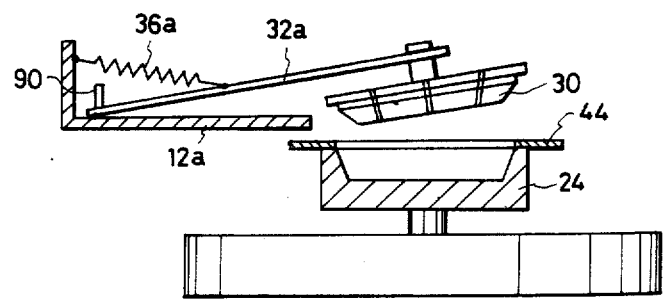
FIG. 8 is a diagrammatic vertical section, partly in elevation, through the clamping means of FIG. 7 in combination with associated drive means.

We have illustrated in FIGS. 7 and 8 another preferred embodiment of our invention which differs from the preceding embodiment in that a clamp arm 32a extends at right angles with the predetermined loading direction 61 of the flexible magnetic disk cartridge 16. Rotatably carrying the clamp 30 on its distal end, the clamp arm 32a is proximally operatively coupled to an upstanding pivot pin 90 on frame means 12a for moving the clamp 30 into and out of engagement with the socketed drive hub 24. A helical compression spring 36a acts between frame means 12a and clamp arm 32a for normally holding the clamp 30 out of engagement with the drive hub 24.

In this alternative embodiment, too, the disk cartridge 16 is so positioned on the drive hub 24 that its geometrical center 58 is offset the prescribed distance A from the axis 84 of the drive hub in a direction away from the fulcrum 70a of the clamp arm 32a. The distance A is $(L1-L2)/2$, as has been set forth in connection with FIGS. 4 and 5. We have employed for thus positioning the disk cartridge 16 offsetting means including not only the pair of stops 62 but also a pair of guide means 92 disposed on the opposite sides of the disk cartridge for guiding same into abutment against the stops. The guide means 92 should of course be so disposed that the disk cartridge 16 may acquire the required position on abutting against the stops 62.

The other details of construction of this alternative embodiment can be as set forth above in conjunction with FIGS. 1 through 5. It will also be appreciated that this second embodiment gains the same advantages as above.

Possible Modifications

Although we have shown and described our invention in terms of but two preferable embodiments thereof, we recognize that our invention could be embodied in other forms within the broad teaching hereof. The following is a brief list of possible modifications or variations of the above disclosed embodiments, all falling within the scope of our invention:

1. The distance A of the displacement of the geometrical center of the flexible disk cartridge from the axis of the drive hub need not be exactly $(L1-L2)/2$ but may only be less than $(L1-L2)$, as the possibility of the disk being depressed into the drive hub socket by the clamp can be drastically reduced in this latter range.

2. The fulcrum of the clamp arm 32a of FIG. 8 could be disposed adjacent the entrance slot in the front face of the apparatus, with the clamp arm extending toward the stops for the disk cartridge. Then the disk cartridge may be positioned on the drive hub with its geometrical center displaced the specified distance from the drive hub axis in a direction away from the entrance slot.

3. The clamp could be configured as shown in FIG. 9. This alternative clamp 30a has a central body portion 94 sleeved via a bushing 96 on a shaft 98 coupled to the clamp arm, and a plurality of clamp segments 100 extending radially from the body portion 94. Each clamp segment 100 comprises a tapered centering portion 102 extending parallel to the body portion 94, a clamping portion 104 extending radially outwardly from the centering portion, and an arcuate bridge portion 106 joining the clamping and centering portions to the body portion. The tapered centering portions 102 of all the clamp segments 100 form in combination a tapered collet to fit in the socket in the drive hub. The clamping portions 104 of all the clamp segments 100 form in combination a flange on the tapered collet to clamp the exposed annular portion of the disk against the disk bearing surface of the drive hub. It will thus been seen that this clamp 30a is essentially equivalent to the clamp 30 except that the clamp segments 100 are individually resiliently displaceable with respect to the body portion 94.

We claim:

1. In an apparatus for data transfer with a recording disk cartridge having a flexible recording disk housed for rotation within a protective envelope, said envelope and recording disk having substantially concentric geometrical centers, the disk being displaceable within the envelope in a plane of rotation, the envelope having formed therein a central opening larger than a central opening in the recording disk to expose an eccentric annular portion thereof when said disk is displaced within said envelope, in combination:

(a) frame means including an entrance slot for loading the recording disk cartridge;

(b) drive means on the frame means including a drive hub rotatable about a predetermined axis, the drive hub having a socket defined coaxially therein with an annular disk bearing surface formed concentrically around the socket;

(c) a clamp carrier pivotable about a predetermined fulcrum on the frame means and in a plane normal to a plane containing the disk bearing surface of the drive hub;

(d) a clamp rotatably mounted to the clamp carrier for joint movement therewith into and out of engagement with the drive hub, the clamp including a collet tapered toward a leading end thereof directed toward the drive hub for engagement in the socket in the drive hub through central opening in the recording disk to center the recording disk with respect to the drive means, and a flange on the tapered collet for clamping the exposed annular portion of the recording disk against the disk bearing surface of the drive hub;

(e) means, attached to the frame means, for offsetting the geometrical center of the loaded recording disk cartridge a predetermined distance from the axis of rotation of the drive hub in a direction away from the fulcrum of the clamp carrier along the plane containing the disk bearing surface, the predetermined distance of offset being less than the difference $L1-L2$, wherein $L1$ is the distance between the point of intersection of the locus of that point on an annular edge around the leading end of the collet which is nearest to the fulcrum of the clamp carrier with the plane containing the disk bearing surface of the drive hub and that point on an annular edge of the drive hub bounding the entrance end of the socket which is nearest to the fulcrum of the clamp carrier, and where $L2$ is the distance between the point of intersection of the locus of that point on the annular edge around the leading end of the collet which is farthest away from the fulcrum of the clamp carrier with the plane containing the disk bearing surface of the drive hub and that point on the annular edge of the drive hub bounding the entrance end of the socket which is farthest away from the fulcrum of the clamp carrier.

2. The data transfer apparatus of claim 1 wherein the predetermined distance of offset is approximately $(L1-L2)/2$.

3. The data transfer apparatus of claim 1 wherein the frame means is adapted to be loaded with the recording disk cartridge in a predetermined direction through the entrance slot and toward the fulcrum of the clamp carrier and substantially along the plane containing the disk bearing surface of the drive hub, and wherein the offsetting means comprises means for stopping movement of the recording disk cartridge in the loading direction.

4. The data transfer apparatus of claim 1 wherein the frame means is adapted to be loaded with the recording disk cartridge in a predetermined direction through the entrance slot and substantially along the plane containing the disk bearing surface of the drive hub, wherein the clamp carrier extends at right angles with the loading direction of the recording disk cartridge within the plane containing the disk bearing surface of the drive hub and wherein the offsetting means comprises means for stopping movement of the recording disk cartridge in the loading direction, and a pair of guide means for guiding the recording disk cartridge in the loading direction and into abutment against the stopping means.

* * * * *

UNITED STATES PATENT AND TRADEMARK OFFICE
CERTIFICATE OF CORRECTION

PATENT NO. : 4,709,283

DATED : November 24, 1987

INVENTOR(S) : Kitahara et al.

It is certified that error appears in the above-identified patent and that said Letters Patent is hereby corrected as shown below:

Column 2, line 23, the word "the" should be --that-- which appears after the word "between".

Column 2, line 46 please change the word "he" to --the-- which appears after the word "around".

Column 2, line 57, please change the word "out" to --our--.

Signed and Sealed this

Twenty-first Day of June, 1988

Attest:

DONALD J. QUIGG

*Attesting Officer*   *Commissioner of Patents and Trademarks*